Sept. 13, 1966     O. VIELMO ETAL     3,272,092
LUBRICATING ARRANGEMENT FOR A RECIPROCATING COMPRESSOR
Filed Jan. 26, 1965
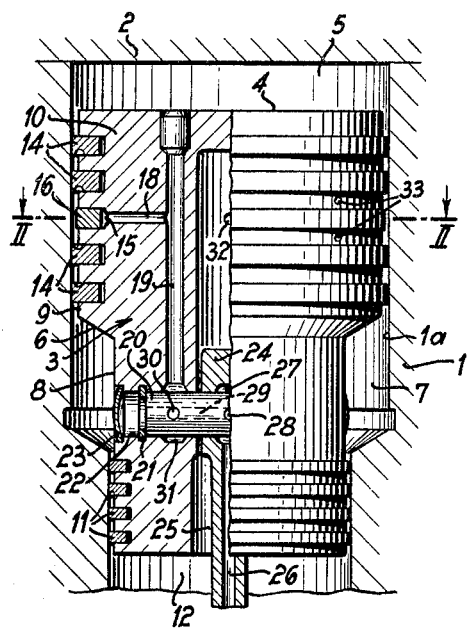
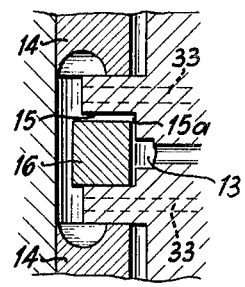
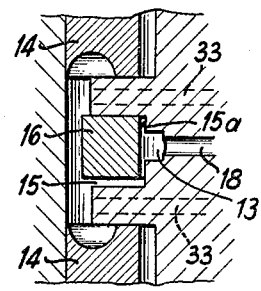
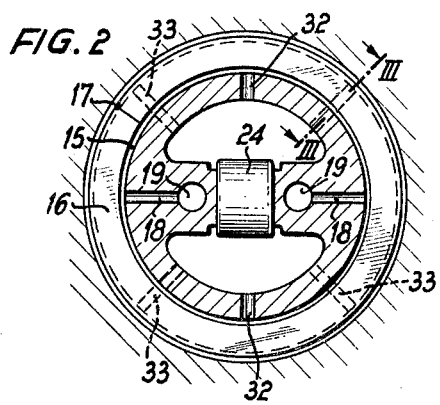
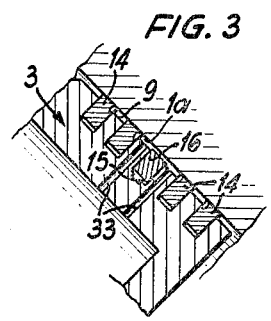
INVENTORS
Oskar Vielmo
Josef Trui
by Michael J. Striker United States Patent Office 3,272,092
Patented Sept. 13, 1966

3,272,092
LUBRICATING ARRANGEMENT FOR A
RECIPROCATING COMPRESSOR
Oskar Vielmo, Stuttgart-Sonnenberg, and Josef Trui, Bissingen, Germany, assignors to Robert Bosch G.m.b.H., Stuttgart, Germany
Filed Jan. 26, 1965, Ser. No. 428,100
Claims priority, application Germany, Feb. 27, 1964, B 75,621
6 Claims. (Cl. 92—157)

This invention relates to reciprocating engines, and particularly to an arrangement for lubricating and cooling the piston of a reciprocating compressor.

In its more specific aspects, the invention is concerned with the lubrication and the cooling of the differential piston in a two-stage compressor of a type commonly employed in automotive engines. The low-pressure chamber of the compressor with which this invention is particularly concerned is axially defined between the cylinder head and the free radial end face of the piston, and the high-pressure chamber is annular and sealed from the crankcase by piston rings which prevent adequate amounts of crankcase lubricant from reaching the portion of the cylinder wall which cooperates with a corresponding portion of the circumferential piston wall to seal the low-pressure and high-pressure chambers from each other.

A primary object of the invention is the provision of an arrangement for lubricating and cooling the circumferential wall portion of the cylinder which engages sealing rings on the piston to separate the low- and high-pressure chambers of the compressor.

Another object is the provision of means for precisely limiting the amount of lubricant on the cylinder wall.

With these and other objects in view, the invention mainly resides in a control ring which is axially interposed between the several sealing rings of a compressor piston between the low-pressure and high-pressure chambers. The control ring is received in a circumferential groove of the piston and is dimensioned for slight axial and radial displacement in the groove. It defines a circumferentially extending channel near the groove bottom. Lubricant is fed to the channel at least at one point, and is withdrawn from the channel at another, circumferentially spaced point.

The exact nature of this invention as well as other objects and features thereof will be readily apparent from consideration of the following specification relating to the annexed drawing in which:

FIG. 1 is a fragmentary axially sectional view of a two-stage reciprocating compressor of the invention;

FIG. 2 shows the compressor of FIG. 1 in radial section on the line II—II;

FIG. 3 shows a detail of the compressor in axial section on the line III—III in FIG. 2;

FIG. 4 shows a detail of FIG. 1 on a larger scale; and

FIG. 5 illustrates the device of FIG. 4 in a different operative position.

Referring now to the drawing in detail, and initially to FIG. 1, there is seen a portion of a compressor whose cylinder 1 is axially closed at one end by a head 2. This end will hereinafter be referred to as the upper end of the cylinder, but it will be appreciated that the compressor of the invention is operative in any position.

The cavity of the cylinder 1 is stepped. The cylinder wall 1a near the head 2 has a larger diameter than the cylinder wall near the lower end. A differential piston 3 of corresponding shape is axially slidable in the cylinder. The free radial end face 4 of the piston and the cylinder head 2 axially bound the low pressure chamber 5 of the compressor. An annular conically tapering face 6 of the piston and a corresponding wall of the cylinder 1 axially bound an annular high pressure chamber 7 between the cylinder wall 1a and the shank 8 of the piston 3. The conduits which supply the gas to be compressed to the low pressure chamber 5, which connect the chambers 5 and 7, and which receive the compressed gas from the chamber 7 have been omitted from the drawing for the sake of clarity since they may be entirely conventional, and are not directly relevant to this invention. It will be understood that these conduits are equipped with necessary check valves and other conventional controls.

The enlarged head portion 10 of the piston 3 has a circumferential wall 9 closely adjacent the wall 1a of the cylinder, and corresponding wall portions of the shank 8 and of the narrower cylinder portion are similarly arranged. Compression rings 11 between the last-mentioned walls seal the high-pressure chamber 7 from the crankcase space 12.

The seal between the piston wall 9 and the cylinder wall 1a is formed by four conventional oil control rings 14 arranged in correspondnig annular axially spaced grooves in the piston wall. The rings 14 are arranged in pairs on either axial side of an annular groove 15. As better seen in FIGS. 4 and 5, annular shoulders 15a and the bottom of the groove 15 define a narrow circumferential channel 13 which is open in a radially outward direction. A split control ring 16 of resilient material such as spring steel is partly received in the groove 15. As seen in FIG. 2, the ring is prestressed in such a manner that its free circumferential ends sealingly engage each other at 17. For the purpose of this discussion, the ring is therefore circumferentially continuous.

The dimensions of the ring 16 are such that it may move axially and radially in the groove 15. When the ring abuts against one of the radial walls of the piston 3 in the groove, it is spaced about 0.03 to 0.05 millimeter from the other radial wall. When the ring is coaxial with the piston 3, its radial spacing from the shoulders 15a is even smaller. The ring 16 thus bounds the channel 13 in a radially outward direction, but does not entirely close the channel. The ring cannot fully enter the channel because abutting engagement with the shoulders 15a limits its radially inward movement.

The groove 15 receives liquid lubricant from the non-illustrated pump of a largely conventional force-feed lubrication system through two diametrically opposite radial conduits 18 in the piston 3 which communicate with respective axial bores 19.

A full-floating hollow piston pin 20 is axially secured in a transverse bore 22 of the piston 3 by snap rings 21. The bore is sealed at its ends by covers 23. The pin 20 pivotally engages the hole in the upper end 24 of a connecting rod 25. A longitudinal bore 26 in the connecting rod is connected with the afore-mentioned pump in a conventional manner (not shown). The bore 26 communicates with an annular groove 27 in the rod 25 about the pin 20. A central radial bore 28 in the pin 20 connects the groove 27 with the hollow interior 29 of the pin 20. Two radial bores 30 of the pin 20, of which only one is visible in the drawing, are respectively aligned with the two piston bores 19, and communicate with them by way of corresponding annular grooves 31 in the transverse bore 22.

As best seen in FIG. 2, the piston 3 is hollow, and its major internal cavity is downwardly open to communicate with the crankcase space 12. As seen in FIG. 2, two oil return ducts 32 pass radially from the bottom of the groove 15 to the piston cavity. The orifices of the ducts 32 in the groove bottom are offset 90° from the orifices of the conduits 18. Four pairs of return conduits 33 are spaced about the groove 15 in such a manner that the orifices of each pair are equiangularly spaced from a conduit 18 and a duct 32 on respective axial levels on either side of the groove 15 between the groove and the nearest oil control ring 14.

When the compressor is operated, the cylinder wall portion engaged by the compression rings 11 is lubricated by oil spray from the crankcase. Oil fed to the bore 26 of the connecting rod 25 is discharged into the groove 15. A major portion of this oil is returned to the pump in the crankcase through the circumferential channel 13 and the ducts 32 and merely cools the piston. A minor portion of the oil enters the narrow gap between the control ring 16 and the walls of the groove 15.

When the direction of piston movement is reversed in top dead center, the control ring, which always trails the piston proper, moves from the position illustrated in FIG. 4 into that shown in FIG. 5. A minute amount of oil retained between the axially spaced opposite walls of the ring 16 and the piston 3 in the groove 15 is expelled toward the cylinder wall 1a to lubricate the same. The excess lubricant is scraped from the wall 1a by the rings 14 and is returned to the sump through the conduits 33. At bottom dead center, the ring 16 reverts from the position of FIG. 5 to that shown in FIG. 4, and additional lubricant is discharged toward the wall 1a.

With the afore-described clearance between the ring 16 and the walls of the groove 15, the amount of lubricant expelled by the ring 16 toward the wall 1a at usual operating speeds for a compressor of the type described in an automotive engine is of the order of 250 cm.$^3$ per minute, and is amply adequate for lubricating the cylinder wall 1a which is not otherwise readily accessible.

It should be understood, of course, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. In a compressor, in combination, a cylinder member; a piston member mounted in said cylinder member for axially reciprocating movement, said members having respective closely adjacent circumferential walls; a plurality of axially spaced sealing ring means on said wall of the piston member in sliding engagement with said wall of the cylinder member, said piston member being formed with an annular groove axially intermediate two of said sealing ring means; a control ring arranged in said groove, said ring being dimensioned for limited axial and radial movement in said groove during said reciprocating movement of the piston member and defining a circumferentially extending channel in said groove; lubricant feed means for feeding a liquid lubricant to one circumferential portion of said channel; and lubricant return means for withdrawing at least a portion of the fed lubricant from another portion of said channel circumferentially spaced from said one portion.

2. In a reciprocating engine, in combination: a cylinder member; a piston member mounted in said cylinder member for axially reciprocating movement, said members having respective closely adjacent circumferential walls; a plurality of axially spaced sealing ring means on said wall of the piston member in sliding engagement with said wall of the cylinder member, said piston being formed with an annular groove axially intermediate two of said sealing ring means; a circumferentially continuous control ring of resilient material arranged in said groove, said ring being dimensioned for limited axial and radial movement in said groove during said reciprocating movement of the piston member and defining a circumferentially extending channel in said groove; lubricant feed means for feeding a liquid lubricant to one circumferential portion of said channel; and lubricant return means for withdrawing at least a portion of the fed lubricant from another portion of said channel circumferentially spaced from said one portion.

3. In a reciprocating engine, in combination: a cylinder member; a piston member mounted in said cylinder member for axially reciprocating movement, said members having respective closely adjacent circumferential walls; a plurality of axially spaced sealing ring means on said wall of the piston member in sliding engagement with said wall of the cylinder members, said piston member being formed with an annular groove axially intermediate two of said sealing ring means, said groove having a bottom face; a circumferentially continuous control ring of resilient material arranged in said groove, said ring being dimensioned for limited axial and radial movement in said groove during said reciprocating movement of the piston member; abutment means in said groove for preventing radial engagement of said ring with said bottom face, whereby a circumferentially extending channel is radially bounded by said ring in said groove; lubricant feed means for feeding a liquid lubricant to one circumferential portion of said channel; and lubricant return means for withdrawing at least a portion of the fed lubricant from another portion of said channel circumferentially spaced from said one portion.

4. In a compressor, in combination: a cylinder member; a piston member mounted in said cylinder member for axially reciprocating movement, said members having respective closely adjacent circumferential walls; a plurality of axially spaced sealing ring means on said wall of the piston member in sliding engagement with said wall of the cylinder member, said piston member being formed with an annular groove axially intermediate two of said sealing ring means, said groove having a bottom face and said piston member having an annular shoulder in said groove projecting from said face in a radially outward direction; a control ring arranged in said groove, said ring being dimensioned for limited axial and radial movement in said groove during said reciprocating movement of the piston member and being radially engageable with said shoulder for defining a circumferentially extending channel in said groove; lubricant feed means for feeding a liquid lubricant to one circumferential portion of said channel; and lubricant return means for withdrawing at least a portion of the fed lubricant from another portion of said channel circumferentially spaced from said one portion.

5. In a compressor, in combination: a cylinder member; a piston member mounted in said cylinder member for axially reciprocating movement, said members having respective closely adjacent circumferential walls; a plurality of axially spaced sealing ring means on said wall of the piston member in sliding engagement with said wall of the cylinder member, said piston member being formed with an annular groove axially intermediate two of said sealing ring means; a control ring arranged in said groove, said ring being dimensioned for limited axial and radial movement in said groove during said reciprocating movement of the piston member and defining a circumferentially extending channel in said groove; lubricant feed means for feeding a liquid lubricant to one circumferential portion of said channel; first lubricant return means for withdrawing a portion of the fed lubricant from another portion of said channel circumferentially spaced from said one portion; and second lubricant return means for withdrawing another portion of the fed lubricant, said second return means including a conduit having an orifice in said wall of the piston member intermediate said groove and one of said two sealing ring means.

6. In a compressor, in combination: a cylinder member; a piston member mounted in said cylinder member for axially reciprocating movement, said members having respective closely adjacent circumferential walls; a plurality of axially spaced sealing ring means on said wall of the piston member in sliding engagement with said wall of the cylinder member, said piston member being formed with an annular groove axially intermediate two of said sealing ring means; a control ring arranged in said groove, said ring being dimensioned for limited axial and radial movement in said groove during said reciprocating movement of the piston member and defining a circumferentially extending channel in said groove; lubricant feed means for feeding a liquid lubricant to one circumferential portion of said channel; first lubricant return means for withdrawing a portion of the fed lubricant from another portion of said channel circumferentially spaced from said one portion; and second lubricant return means for withdrawing another portion of the fed lubricant from a portion of said wall of the piston member spaced from said control ring in a direction away from said channel.

References Cited by the Examiner
UNITED STATES PATENTS

| | | | |
|---|---|---|---|
| 1,313,905 | 8/1919 | Mummert | 92—158 |
| 1,330,748 | 2/1920 | Rogatchoff | 92—156 |
| 2,386,117 | 10/1945 | Hvid | 92—157 X |

MARTIN P. SCHWADRON, *Primary Examiner.*

I. C. COHEN, *Assistant Examiner.*